US007449994B1

(12) United States Patent
Koerner et al.

(10) Patent No.: US 7,449,994 B1
(45) Date of Patent: Nov. 11, 2008

(54) ENGINE MOUNTED FAULT INDICATORS

(75) Inventors: Scott A. Koerner, Kenosha, WI (US); Mark J. Skrzypchak, Pleasant Prairie, WI (US)

(73) Assignee: BRP US Inc., Sturtevant, WI (US)

( * ) Notice: Subject to any disclaimer, the term of this patent is extended or adjusted under 35 U.S.C. 154(b) by 92 days.

(21) Appl. No.: 10/708,068

(22) Filed: Feb. 6, 2004

(51) Int. Cl.
*B60C 23/00* (2006.01)
*G06F 19/00* (2006.01)

(52) U.S. Cl. ...................................... 340/438; 701/101

(58) Field of Classification Search .................. 701/99, 701/100, 101, 102, 112, 113, 114; 123/479, 123/690; 340/438
See application file for complete search history.

(56) References Cited

U.S. PATENT DOCUMENTS 3,960,011 A * 6/1976 Renz et al. .................... 73/116
4,292,841 A * 10/1981 Wesley ..................... 73/119 A
4,316,134 A * 2/1982 Balan et al. .................... 322/99
4,339,801 A * 7/1982 Hosaka et al. .............. 701/102
5,138,874 A * 8/1992 Davis ........................ 73/118.1
5,460,582 A * 10/1995 Palansky et al. ............ 477/138
5,729,456 A * 3/1998 Boisvert et al. ............... 701/99
6,820,584 B2 * 11/2004 Koerner et al. .......... 123/196 R
6,908,225 B2 * 6/2005 Tsukamoto et al. ............ 374/1
2004/0019461 A1 * 1/2004 Bouse et al. ................ 702/188

* cited by examiner

*Primary Examiner*—John T Kwon
(74) *Attorney, Agent, or Firm*—Osler, Hoskin & Harcourt LLP

(57) ABSTRACT

An outboard motor is presented that includes a control unit to control operation of an internal combustion engine and automated components of the motor. An array of indicators is associated with the control unit directly on an external or visible surface thereof or integrally formed therewith. The indicators may be independently activated to convey diagnostic information regarding engine operation. The control unit controls activation of the indicators in such a manner such that different diagnostic data is conveyed depending upon whether the engine is in an operating or starting mode.

25 Claims, 4 Drawing Sheets

ENGINE MOUNTED FAULT INDICATORS

BACKGROUND OF INVENTION

The present invention relates generally to internal combustion engines and, more particularly, to a visible conveyance of fault or diagnostic data to a user or service technician through one or more indicators mounted to or integrally formed with an engine management module (EMM), or an engine control unit (ECU), mountable to an internal combustion engine. As such, engine diagnostics may be generally determined directly from the engine without connection to separate diagnostic equipment.

As a result of more stringent environmental concerns, desire for improved fuel efficiency, reduced noise emission, consumer desire for more robust operation, and the like, engine design and operation has become increasingly more complex. Contributing to this increased complexity is the incorporation of additional mechanical and electronic components to control operation of the engine. Moreover, because of the precision required to optimize performance of the engine, several of the automated or electronic systems are monitored and/or controlled by an ECU. The ECU processes feedback or sensory information relayed by the various electronic systems to not only optimize engine operation, but also determine if an engine component is operating improperly or has completely malfunctioned. In some applications, the ECU relays certain limited fault information to a dashboard or other control panel distant from the engine for viewing by a user. In this regard, the user may be made aware of improper engine operation without directly inspecting or viewing the engine. Such a system is particularly prevalent in automotive applications and other large scale engine applications, such as relatively large marine applications.

In other applications, however, relaying of fault or diagnostic data to gauges or other indicators in a dashboard or control panel separate from the engine may not be practical, feasible, or adequate. For example, in some marine applications, an outboard motor is mounted to a small boat not equipped with any such indicators. That is, the vessel may not be equipped to support the translation of diagnostic data from the engine's EMM/ECU to an electronic dashboard or control panel on the vessel. While some diagnostic information such as low oil level may be possible, more complex engine diagnostics may not be. Accordingly, for the operator to ascertain this more complex diagnostic information, the operator must either connect diagnostic equipment to the engine, perform diagnostic analysis on the engine/motor to isolate a malfunction, or take the motor in for service. Reliance on such a system is not only time-consuming, but is inadequate when an operator is unable to use diagnostic equipment or must attempt self-diagnosis.

Further, when servicing the engine, absent an intuitive knowledge of the engine component fault, the service technician is unable to make a targeted inspection of the engine and its components without employing separate diagnostic equipment. Simply put, incorporation of a series of fault indicators on the engine itself will not only assist an operator in identifying and correcting a fault, but assist a service technician in diagnosing the underlying problem more efficiently.

It would therefore be desirable to have an apparatus that includes an array of fault indicators mounted directly to or integrally formed with the engine such that diagnostic data may be ascertained directly from the engine without engine disassembly or implementation of separate diagnostic tools.

BRIEF DESCRIPTION OF INVENTION

The present invention provides an apparatus and method of visually conveying fault information to an engine operator or service technician that overcomes the aforementioned drawbacks.

An outboard motor is disclosed that includes a control unit, such as an EMM, to control and monitor operation of an internal combustion engine and automated components of the motor. The control unit is mounted to provide easy viewing of an array of operational indicators by an operator or service technician when a motor cover is removed. The indicators may be independently activated to convey diagnostic information regarding engine operation. Operational circuitry of the control unit controls activation of the indicators in such a manner that different diagnostic data is conveyed depending upon the operating mode of the engine. For instance, the indicators may be controlled in one manner when the engine is operating at start-up and controlled differently when the engine is operating in a running mode.

Preferably, the control unit includes a label that provides a brief, textual description, i.e. legend, of each indicator so as to provide a quick reference to a user or service technician when determining the type of fault or system error deemed present. For a dual mode system, the label would preferably include two sets of text corresponding to the different types of faults that may be conveyed through activation of a respective indicator based on the engine operating mode. Preferably, the indicators are LEDs that are selectively caused to illuminate based on the type of fault detected and engine operating mode. In this regard, in a preferred operation, all the LEDs are illuminated during normal or fault-free engine start-up. Conversely, if a fault is deemed present during operation of the engine in engine running mode, a respective or corresponding LED is illuminated.

Therefore, in accordance with one aspect of the present invention, a control unit is disclosed that includes a housing enclosing various operational circuitry that is designed to control operation of an internal combustion engine. The control unit further includes a number of operating condition indicators located within an engine compartment and electronically connected to at least a portion of the various operational circuitry that are mounted onto, or in close proximity with, the housing.

In accordance with another aspect, the present invention includes an outboard motor having an internal combustion engine and a multi-mode set of fault indicators mounted directly to a portion of the internal combustion engine. The set of indicators provides at least one form of feedback to a user regarding at least one of operational condition at start-up and operational condition during running.

According to another aspect, the invention includes an engine monitoring system configured to control illumination of a set of indicators based on engine operation. The system is designed to change illumination of the set of indicators indicating engine starting conditions and change illumination of the set of indicators indicating engine running condition.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

Figure 1:
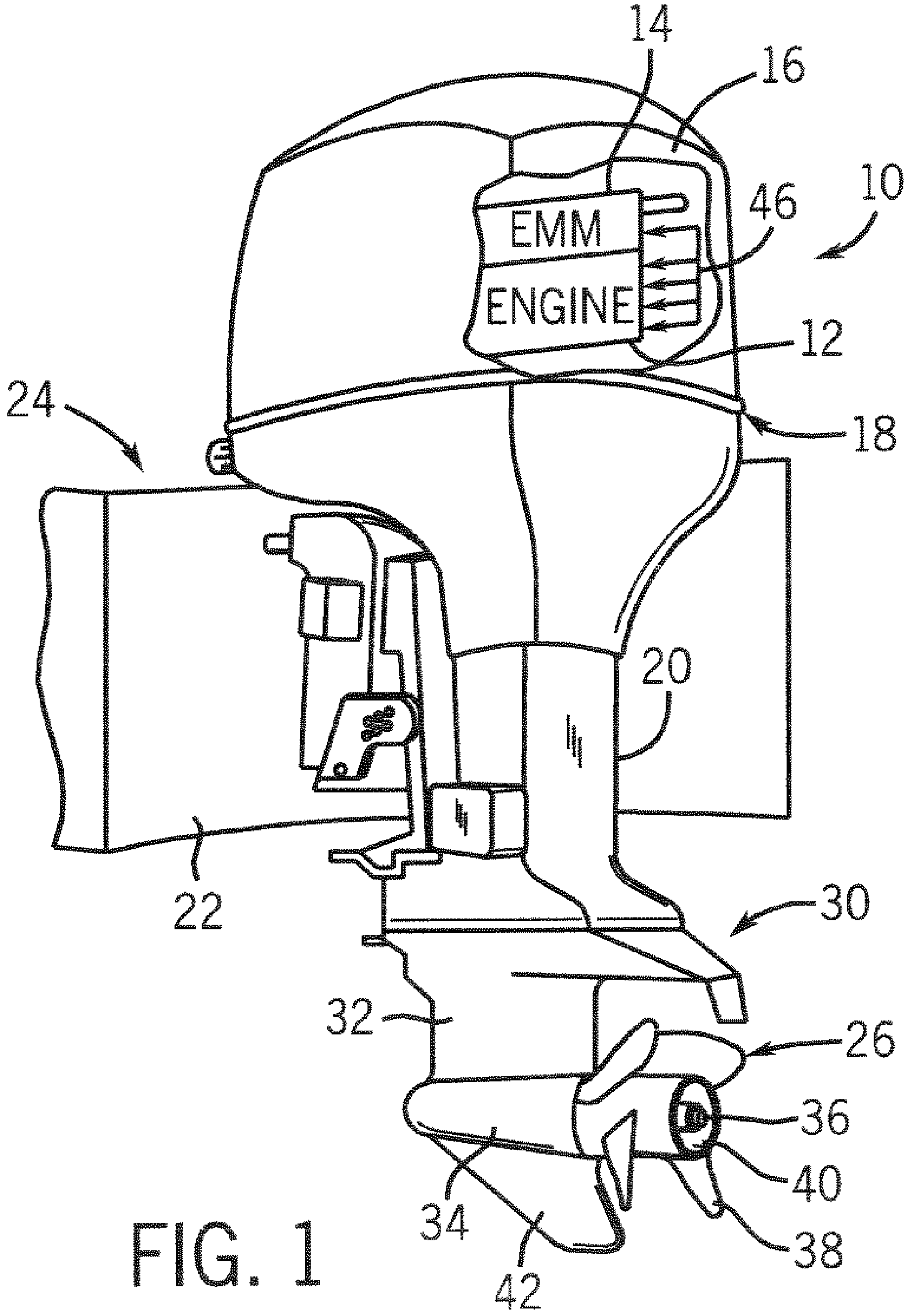
FIG. 1 is a perspective view of an exemplary outboard motor incorporating the present invention.

The present invention relates generally to internal combustion engines, and preferably, those whose operations are controlled by an engine management module (EMM), or more generally, by a control unit or ECU. FIG. 1 shows an outboard motor 10 having an engine 12 controlled by a control unit 14 mounted directly to the engine under engine cover 16. Engine 12 is housed generally in a power-head 18 and is supported on a mid-section 20 configured for mounting on a transom 22 of a boat 24 or other water-going vessel in a known conventional manner. Engine 12 is coupled to transmit power to a propeller 26 to develop thrust and propel boat or other watercraft 24 in a desired direction. The motor 10 includes a lower unit 30 having a gear case 32 that includes a bullet or torpedo section 34 formed therein and housing a propeller shaft 36 that extends rearwardly therefrom. Propeller 26 is driven by propeller shaft 36 and includes a number of fins 38 extending outwardly from a central hub 40 through which exhaust gas from engine 12 is discharged via mid-section 20. A skeg 42 depends vertically downwardly from torpedo section 34 to protect propeller fins 38 and encourage the efficient flow of outboard motor 10 through water. One skilled in the art will appreciate that engine 12 may be either a two-cycle or a four-cycle internal combustion engine; however, in a preferred embodiment, engine 12 is a two-cycle engine that may be used in various modalities that include an outboard motor, snowmobile, ATV, PWC, or various lawn and garden applications and equipment. Additionally, the engine may be electronically started or rope started.

Moreover, while many believe that two-stroke engines are generally not environmentally friendly engines, such preconceptions are misguided in light of contemporary two-stroke engines. Modern direct injected two-stroke engines and, in particular, EVINRUDE outboard motors, are compliant with not only today's emission standards, but emissions standards well into the future. However, since these engines are so advanced, they require trained technicians perform certain repairs and adjustments. As such, a significant portion of the ability to manipulate the operation of these motors has been restricted to qualified personnel in an effort to ensure the future emission efficiency of the engines. Further, the illustrated outboard motor has fuel injectors that are extremely fast and responsive. These injectors are not only state-of-the-art in terms of performance, they are so highly tuned that engines so equipped greatly exceed environmental emissions standards for years to come. To obtain such exacting performance, the injectors operate at a rather high voltage, preferably 55 volts.

Control unit 14 includes various operational circuitry to control operation of the engine 12 as well as auxiliary components of the outboard motor 10. In this regard, the control unit 14 is responsible for interpreting electrical signals sent by engine sensors (not shown) or other motor sensors (not shown) for activating and otherwise controlling automated engine and motor components and processes in order to produce optimum engine and motor performance. A portion of the operational circuitry collectively forms an engine control unit (ECU) that is designed and otherwise programmed to control operation of the engine 12. Generally, the ECU includes one or more microprocessors and memory with electronic maps that controls operation of the engine and its components, such as the fuel injection or ignition systems. To this end, several engine sensors provide feedback to an EMM across feedback loops 46 to enable the EMM (or ECU) to dynamically control not only engine operation, but also operation of secondary and optional systems associated with the given modality application.

Figure 2:
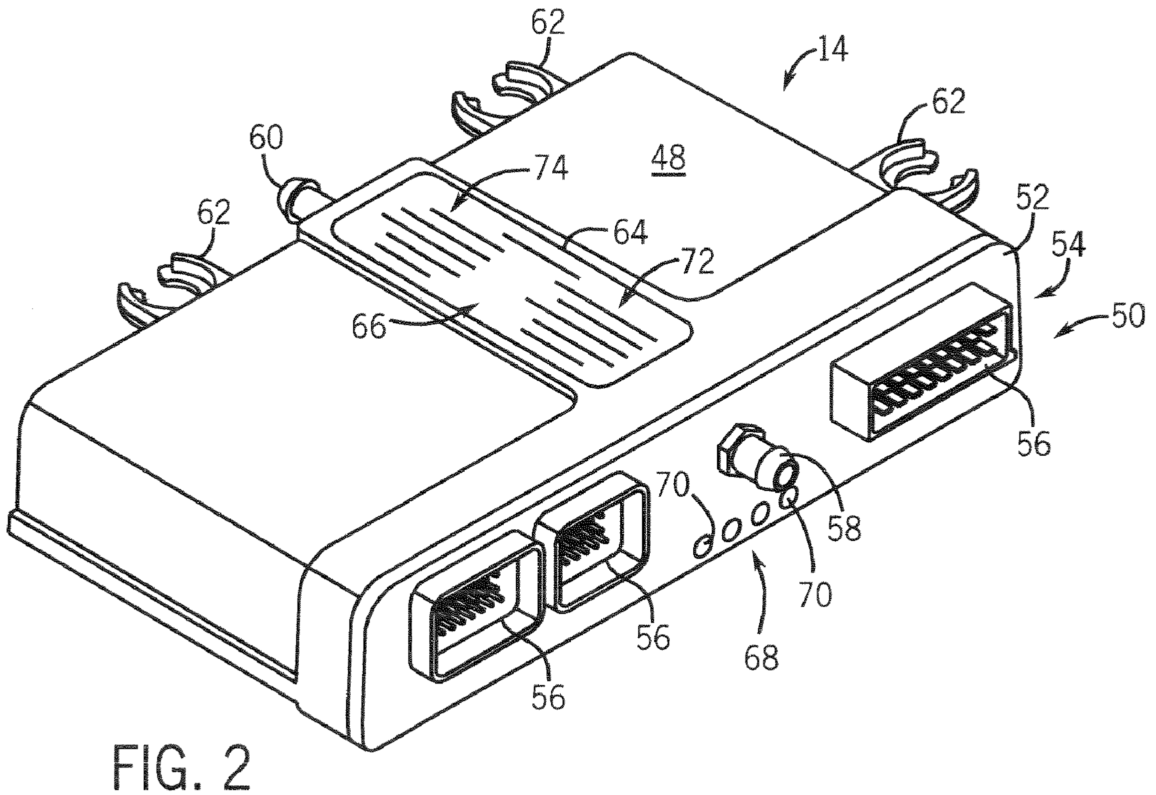
FIG. 2 is a perspective view of a control unit having a number of fault indicators thereon according to the present invention.

Referring now to FIG. 2, a perspective view of the control unit 14 removed from engine 12 is shown. Control unit 14 includes a housing 48 constructed to enclose various operational circuitry (not shown). At one end 50 of the control unit 14, a cover or seal 52 is secured to, or formed with, housing 48. Extending through seal 52 is a communications array 54 that includes a plurality of multi-pin connectors 56. The multi-pin connectors 56 provide an electrical link or communication between the control unit and the control systems of the engine or other components of the motor. It is understood that multi-pin connectors 56 could have either a male or a female-type engagement with an engine connector (not shown). It is also understood that each of the multi-pin connectors 56 can be constructed to prevent interchangeability between the engine connectors. Such a construction allows the control unit to be installed relatively quickly while ensuring that each multi-pin connector 56 is connected to a proper engine system communications link.

An inlet coupler 58 extends through seal 52 and an outlet coupler 60 extends through housing 48. Inlet and outlet couplers 58, 60 allow a coolant path to continually circulate coolant through control unit 14. As such, electrical components of the operational circuitry located within housing 48 are protected from the atmosphere in which the engine is operated and are adequately cooled. A plurality of mounting brackets 62 extend from housing 48 and are constructed to secure control unit 14 directly to the engine. Couplers 58, 60 are constructed to be quickly attached to a hose (not shown) for the passage of coolant from a coolant reservoir (not shown) through the control unit.

Figure 3:
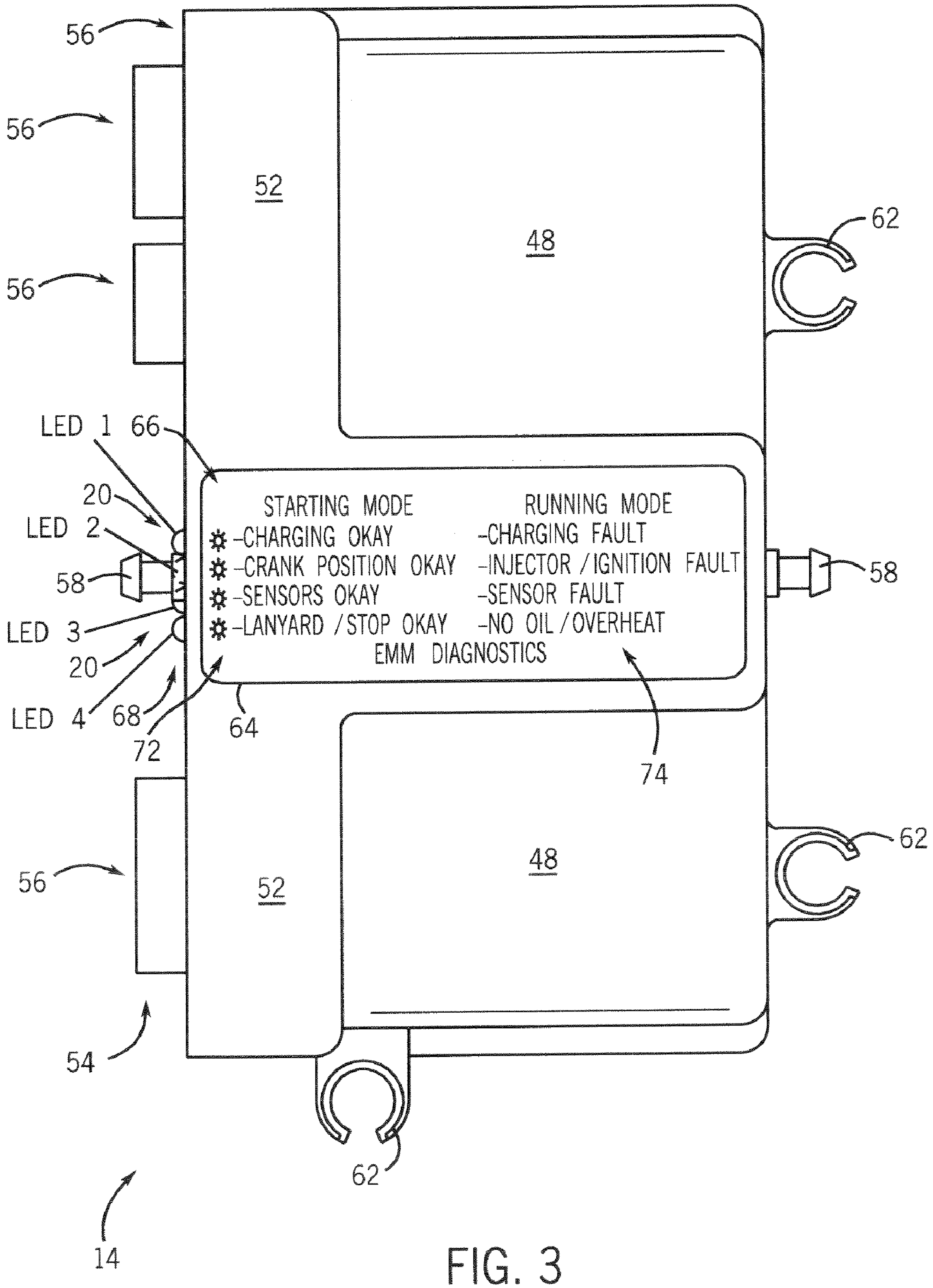
FIG. 3 is a top planar view of the control unit shown in FIG. 2.

Affixed to an external or visible surface of housing 48 is a label 64 that includes a legend of text 66 that, as will be described in greater detail, provides textual description for an array of operating condition indicators 68, e.g. light emitting diodes (LEDs), which in the example of FIG. 3 are labeled LED1, LED2, LED3, and LED4, mounted or otherwise integrally formed within cover 54, as illustrated in FIG. 2, or housing 48. In the illustrated example, array 68 includes four independent indicators 70. As will be described, each indicator is activated based on whether or not a fault condition is deemed present and further based on engine operating mode. For example, the engine operating modes may include: (1) engine start-up and (2) engine running. Accordingly, label 64 may include two sets of text 72, 74 corresponding to the pair of illustrated operating modes. Furthermore, each set of text 72, 74 includes a descriptor for each of the indicators 70. As such, in the illustrated example, each set of text 72, 74 includes four descriptors for the four indicators 70 of array 68.

Referring to FIG. 3, a top planar view of control unit 14 illustrates one preferred placement of label 64 on an external surface of housing 48. Further illustrated are examples of exemplary textual language that may be used for each indicator descriptor when used to identify fault or other engine operating conditions. Further to the example given above, the exemplary textual language is bifurcated between "Starting Mode" and "Running Mode" text. One skilled in the art will appreciate that other textual language may be used for each descriptor and that more or less than two engine operating modes may be identified.

The textual descriptors are designed to allow a user or service technician to determine and analyze engine performance or operation directly from activation of one or more indicators directly mounted to the engine. In this regard, the control unit is preferably situated in the motor compartment such that an operator or service technician may visibly see each of the indicators and label with relative ease. In one embodiment, the indicators and label are viewable with the engine cover 16, or a respective portion thereof, removed. In another embodiment, engine cover 16 may be fitted with a retractable or hinged plate (not shown) that allows an operator to selectively reveal the indicators and label.

As noted above, in an exemplary embodiment, two sets of descriptors are used to guide a user or service technician in engine diagnostics. Accordingly, the "Starting Mode" indicators may include an indicator for each of the following: (1) "Charging Okay" (2) "Crank Position Okay" (3) "Sensors Okay" and (4) "Lanyard/Stop Okay". For the "Running Mode", the indicators would provide a fault indicator for each of the following: (1) "Charging Fault" (2) "Injector/Ignition Fault" (3) "Sensor Fault" and (4) "No Oil/Overheat". Each of the above listed indicators or faults will be described in greater detail below. Moreover, one skilled in the art will readily recognize that other textual descriptive language may be used. Further, it is contemplated that other indications or faults other than those set forth above may be provided and are considered within the scope of this invention. Additionally, it is contemplated that the indicators activate differently depending on the status of the engine. For example, as set forth below, such status can include a starting mode and a running mode. It is further contemplated that additional indicator(s) may be provided on the EMM identifying in which engine operating mode the engine is currently operating.

As mentioned previously, the control unit includes operational circuitry that is designed to control operation of the engine and other electronic or automated components of the outboard motor. The control unit is also programmed to provide diagnostic information based on operating mode of engine and type of fault detected to the operating condition indicators heretofore described. In a preferred embodiment, the indicators are LEDs that are independently caused to illuminate or not illuminate to provide feedback to the user or a service technician. Additionally, the control unit may include memory for storage of a history or log of indicator activation or illumination. Moreover, the memory may be accessed by a service technician to ascertain a history of engine operation.

Figure 4:
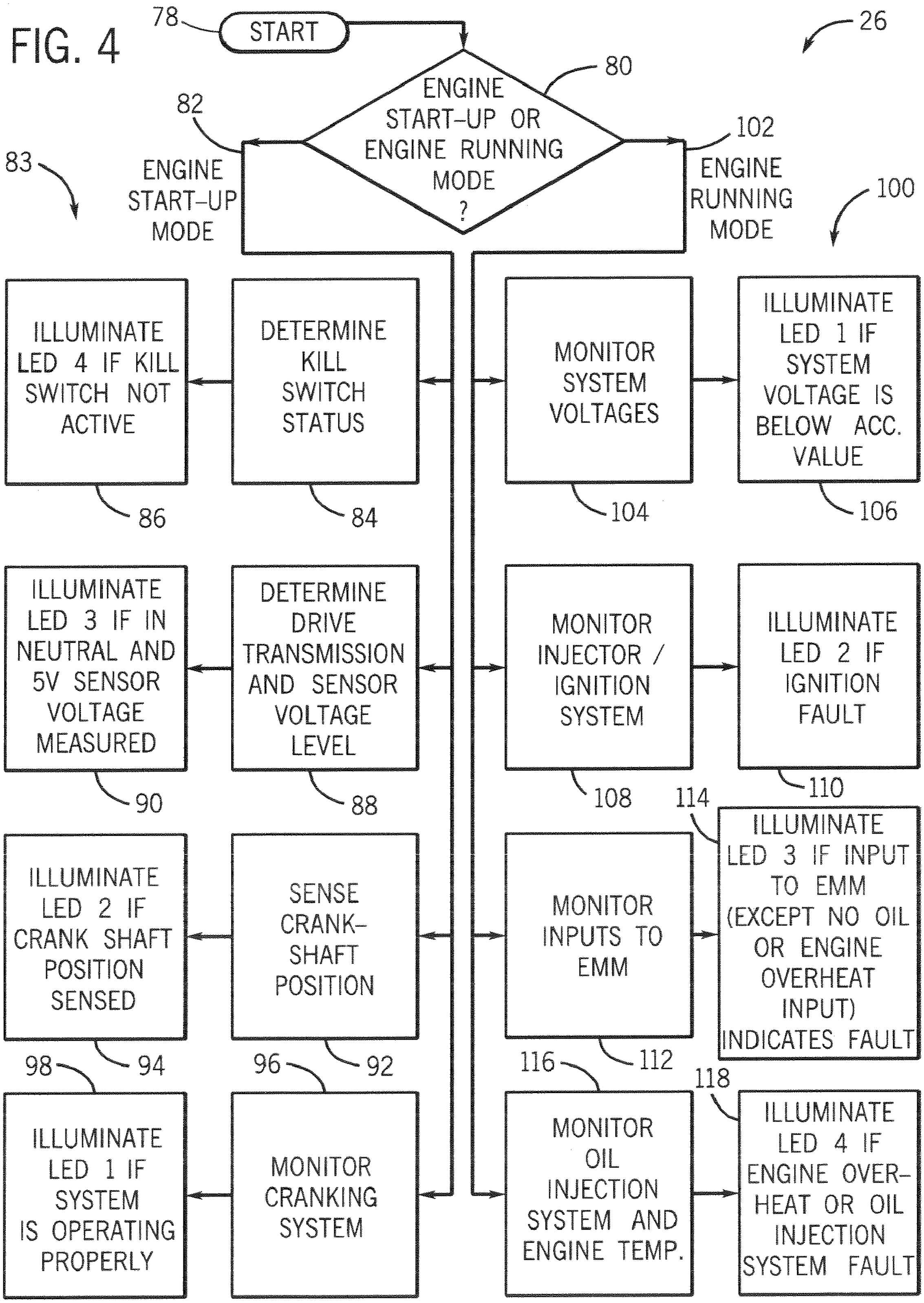
FIG. 4 is a flow chart setting forth an algorithm to control activation of fault indicators mounted to an engine according to the present invention.

FIG. 4 sets forth a control algorithm that is executed to selectively and independently control illumination of the operating condition indicators. The control algorithm 76, which may be carried out by the ECU or other processing units of the EMM, is initiated at 78 at engine start-up and is continuously carried out throughout engine operation. As indicated above, the diagnostics system and the corresponding activation of the indicators depends upon the operating mode of the engine. Accordingly, a determination is made at 80 to determine if the engine is operating in a start-up mode or a running mode. If the engine is deemed to be operating in start-up 80, 82, a number of system checks of subroutine 83 are performed. In the exemplary embodiment, four general engine and motor checks are carried out that correspond to the textual descriptor associated with each indicator described herein. As will be described, if at engine start-up, the monitored systems are operating properly, all the indicators will illuminate until a transfer to engine running mode.

In a preferred embodiment, two of the engine and motor checks are carried out immediately at operator initiation of engine start-up whereas the other two checks are carried out during "cranking" of the engine. More particularly, at the initiation of engine start-up, a determination of the "kill" switch status is made 84. That is, preferably, the outboard motor is equipped with a lanyard (not shown) that is removably connected to the ignition at one end and connectable or holdable to the boat operator at the other end. Generally, the lanyard includes a wrist band that is worn by the boat operator such that the engine can be immediately shut-down if the lanyard is disconnected from the engine. As is known, the lanyard operates as a safety device. Accordingly, if the lanyard is properly engaged with the outboard motor, LED4 is caused to illuminate. Provided the lanyard remains engaged during engine start-up, LED4 will remain lit.

Similar to monitoring of the "kill" switch, status of the drive transmission and sensor voltage level 88 is carried out immediately at the initiation of engine start-up. In this regard, two general systems checks are carried. First, illumination of LED3 at 90 indicates that the drive transmission is in a neutral position. In this regard, in a preferred embodiment, the engine will not start until the drive transmission is placed in neutral. As such, lack of illumination of LED3 may be indicative that the transmission is in an unacceptable position. Additionally, illumination of LED3 indicates that the various system sensors are providing an expected voltage feedback reading. For instance, the throttle position sensor (not shown) is monitored to verify that a short circuit is not present. If the drive transmission is not in neutral or a sensor voltage is unexpected, LED3 will not illuminate thereby indicating to the user or service technician with relative specificity an engine start-up fault.

Once "cranking" of the engine commences, the EMM/ECU monitors and receives feedback regarding crankshaft position 92. LED2 is caused to illuminate if any position of the crankshaft is sensed 94. Sensing of the crankshaft position is needed by the ECU to optimize engine start-up, i.e. optimizing an engine firing sequence based on a position and/or rotational direction of the crankshaft. If a crankshaft position is not sensed then LED2 will not illuminate thereby signaling with relative specificity an engine start-up fault.

Also during engine cranking, the motor charging system is monitored at 96 to determine if at least a thirty volt output is being provided. In the current system, at least thirty volts is preferred for the fuel injection system; however, other voltages are contemplated based on system needs. One skilled in the art will appreciate that the fuel injection system may be operable at more or less than thirty volts and, as such, the charging system is monitored to determine if a voltage is being provided as required by the fuel injection system which may be more or less than thirty volts depending upon the design of the fuel injection system. If less than a minimum voltage is being output by the charging system, LED1 will not illuminate signaling a charging system malfunction. If the charging system is operating properly, LED1 will illuminate 98 and remain lit throughout engine start-up provided proper operation continues.

Each of the engine start-up system checks heretofore described are for illustration purposes and, as such, additional or different system checks other than those specifically described may be carried out at engine start-up. Regardless of the system checked, it is preferred that if all checked systems are operating properly that all the indicators are activated (or lit) during engine start-up. In this regard, the lack of illumination of a particular indicator operates as an indication to the vessel operator or service technician of an engine start-up fault. Additionally, it is preferred that normal operation of the motor be pre-vented if an engine start-up error is detected. To this end, the engine may be prevented from starting or allowed to start in a "limp-home" mode to prevent irreparable damage to the engine and/or motor components. Such a "limp-home" mode would limit engine speed or operation.

Still referring to FIG. 4, once the engine transfers from an engine start-up mode to an engine running mode, an engine running diagnostic subroutine 100 of algorithm 76 is repetitiously carried out. Specifically, if the engine is deemed to be operating in an engine running mode 80, 102 a number of engine running system checks are carried out. The system checks are continuously applied throughout operation in the running mode. Moreover, the types of system checks that are carried out are consistent with the textual descriptors provided on label 64 previously described. Further, in contrast to engine start-up, fault-free operation of the engine and/or its components when the engine is operating in a running mode results in none of the indicators on the EMM being illuminated. As such, activation or illumination of an indicator is indicative of a fault condition being deemed present.

For instance, during engine running mode, various system voltages are monitored at 104. If a system voltage is below an acceptable level, LED1 will be caused to illuminate 106. Examples of system voltages that are monitored include battery voltage over time and rail voltage over time. To avoid false fault indications as a result of spikes or short-term declines in voltage levels, it is preferred that the system voltages are measured over time. In this regard, preferably, a fault is not indicated unless the spike or drop in voltage persists for a specified, set period of time.

The injector/ignition system is also monitored 108 during engine running mode. If a fault is deemed present with the injector/ignition system then LED2 is illuminated 110. For instance, LED2 may be illuminated if an open circuit on a fuel injector is detected, if the ignition primary circuit is open, or if the ignition voltage is below an acceptable value or outside an acceptable range. Additionally, LED2 may be caused to illuminate if a shorted injector or fuel pump failure is detected. If these injector/ignition systems are operating properly during engine running, LED2 will not be caused to illuminate.

If a measured input exclusive of an engine overheating or oil system failure signal is received by the EMM/ECU 112 then LED3 will be caused to illuminate 114. For instance, if a short, open, out-of-range, and the like input is received by the EMM/ECU for a monitored system, the EMM/ECU will cause LED3 to illuminate to signal a sensor fault during engine running mode. Oiling system and engine temperature faults are separately handled from other sensed faults and, as such, illumination of LED3 is not directly indicative of an oiling system or engine temperature fault.

The EMM/ECU is configured to control engine operation through dynamic control of the engine lubricating and cooling systems. Accordingly, if an oiling system failure or an engine temperature out-of-range input is received 116 by the EMM/ECU, the EMM/ECU will cause illumination of LED4 at 118. In this regard, if the EMM or engine itself is overheating, LED4 will be caused to illuminate. If a signal indicative of oil pump failure is received, LED4 will be caused to illuminate. If an oil injector circuit is shorted or open, LED 4 will be caused to illuminate. If oil pressure is outside an acceptable range or an oil pressure sensor has failed, LED4 will be caused to illuminate. One skilled in the art will appreciate that other indicators of oiling system/engine temperature faults may be monitored and govern illumination of LED4.

As stated, lack of illumination of an indicator during engine operation in the engine running mode is indicative that the EMM has not received an input or otherwise detected an engine fault. Conversely, illumination of an indicator provides feedback to the operator or service technician that a fault is deemed present. Additionally, it is contemplated that the indicators may be caused to indicate a fault in the indicator itself so as to convey to the operator or service technician that the indicator has failed. For instance, the indicator may blink repeatedly to indicate a fault with the indicator itself.

The present invention has been described with respect to a dual-mode engine diagnostic system. It is contemplated, however, that the present invention is equivalently applicable with single mode diagnostics or other multi-mode systems. Additionally, it is contemplated that faults additional or different from those heretofore described may be detected and used to activate a respective indicator. Further, it is contemplated that the specific application may include gauges, warning lights, and other indicators that provide diagnostic information to the operator or service technician that are redundant with the fault indicators described herein.

Therefore, in accordance with one embodiment of the present invention, a control unit is disclosed that includes a housing enclosing various operational circuitry that is designed to control operation of an internal combustion engine. The control unit further includes a number of operating condition indicators located within an engine compartment and electronically connected to at least a portion of the various operational circuitry that are mounted onto, or in close proximity with, the housing.

In accordance with another embodiment, the present invention includes an outboard motor having an internal combustion engine and a multi-mode set of fault indicators mounted directly to a portion of the internal combustion engine. The set of indicators provides at least one form of feedback to a user regarding at least one of operational condition at start-up and operational condition during running.

According to another embodiment, the invention includes an engine monitoring system configured to control illumination of a set of indicators based on engine operation. The system is designed to change illumination of the set of indicators indicating engine starting conditions and change illumination of the set of indicators indicating engine running condition.

The present invention has been described in terms of the preferred embodiment, and it is recognized that equivalents, alternatives, and modifications, aside from those expressly stated, are possible and within the scope of the appending claims. While the present invention is shown as being incorporated into an outboard motor, the present invention is equally applicable with other recreational products, some of which include inboard motors, snowmobiles, personal watercrafts, all-terrain vehicles (ATVs), motorcycles, mopeds, power scooters, and the like. Therefore, it is understood that within the context of this application, the term "recreational product" is intended to define products incorporating an internal combustion engine that are not considered a part of the automotive industry. Within the context of this invention, the automotive industry is not believed to be particularly relevant in that the needs and wants of the consumer are radically different between the recreational products industry and the automotive industry. As is readily apparent, the recreational products industry is one in which size, packaging, and weight are all at the forefront of the design process, and while these factors may be somewhat important in the automotive industry, it is quite clear that these criteria take a back seat to many other factors, as evidenced by the proliferation of larger vehicles such as sports utility vehicles (SUV).

What is claimed is:

1. An outboard motor comprising:

an internal combustion engine having a vertical crankshaft;

a mid-section disposed below the internal combustion engine and supporting the internal combustion engine, the mid-section being configured for mounting on a transom of a watercraft;

a lower unit disposed below the mid-section, the lower unit including a propeller driven by the internal combustion engine and configured to propel the watercraft; and a set of fault indicators mounted directly to a portion of the internal combustion engine, wherein the set of indicators provides at least one form of feedback to a user regarding at least an operational condition at engine start-up.

2. The outboard motor of claim 1 wherein the at least one form of feedback includes a visual feedback.

3. The outboard motor of claim 2 wherein the set of indicators is configured to illuminate at engine start-up if no engine fault conditions are deemed present.

4. The outboard motor of claim 3 wherein the set of indicators includes a separate indicator to indicate each of the following at engine start-up:

kill switch activation;

sensed crankshaft position;

acceptable charging level attained; and acceptable drive gear position.

5. The outboard motor of claim 4 wherein one indicator is configured to change condition if the drive gear position is in neutral at start-up.

6. The outboard motor of claim 2 further comprising a control unit mounted to the internal combustion engine and wherein the multi-mode set of fault indicators is mounted to the control unit in a manner visible to a user when only a top cover of the outboard motor is removed.

7. The outboard motor of claim 6 wherein the control unit includes a recordable medium accessible by a service technician and configured to maintain a history of any fault indicator.

8. The outboard motor of claim 2 wherein the internal combustion engine is a two-stroke internal combustion engine.

9. The outboard motor of claim 2 further comprising a battery to supply a voltage to a plurality of electronic components.

10. The outboard motor of claim 2 wherein the internal combustion engine is a rope-start engine.

11. The outboard motor of claim 1 wherein the set of indicators provides a form of feedback to a user regarding both an operational condition at start-up and an operational condition during running.

12. The outboard motor of claim 11 wherein the set of indicators includes a separate indicator to indicate each of the following during engine running:

charging system malfunction;

injection/ignition system malfunction;

sensor system malfunction; and engine lubrication/engine temperature malfunction.

13. An outboard motor comprising:

an internal combustion engine having a vertical crankshaft;

a mid-section disposed below the internal combustion engine and supporting the internal combustion engine, the mid-section being configured for mounting on a transom of a watercraft;

a lower unit disposed below the mid-section, the lower unit including a propeller driven by the internal combustion engine and configured to propel the watercraft; and at least one fault indicator mounted to a portion of the outboard motor, wherein the at least one fault indicator provides at least one form of feedback to a user regarding at least an operational condition at engine start-up.

14. The outboard motor of claim 13 wherein the at least one fault indicator is a multi-mode set of fault indicators.

15. The outboard motor of claim 13 wherein the at least one form of feedback includes a visual feedback.

16. The outboard motor of claim 15 wherein the at least one indicator is configured to illuminate at engine start-up if no engine fault conditions are deemed present.

17. The outboard motor of claim 16 wherein the at least one indicator includes a separate indicator to indicate each of the following at engine start-up:

kill switch activation;

sensed crankshaft position;

acceptable charging level attained; and acceptable drive gear position.

18. The outboard motor of claim 17 wherein one of the at least one indicators is configured to change condition if the drive gear position is in neutral at start-up.

19. The outboard motor of claim 15 further comprising a control unit mounted to the internal combustion engine and wherein the fault indicator is mounted to the control unit in a manner visible to a user when only a top cover of the outboard motor is removed.

20. The outboard motor of claim 19 wherein the control unit includes a recordable medium accessible by a service technician and configured to maintain a history of the fault indicator.

21. The outboard motor of claim 15 wherein the internal combustion engine is a two-stroke internal combustion engine.

22. The outboard motor of claim 15 further comprising a battery to supply a voltage to a plurality of electronic components.

23. The outboard motor of claim 15 wherein the internal combustion engine is a rope-start engine.

24. The outboard motor of claim 13 wherein the at least one indicator provides a form of feedback to a user regarding both an operational condition at start-up and an operational condition during running.

25. The outboard motor of claim 24 wherein the at least one indicator includes a separate indicator to indicate each of the following during engine running:

charging system malfunction;

injection/ignition system malfunction;

sensor system malfunction; and engine lubrication/engine temperature malfunction.

* * * * *